United States Patent

Rudell et al.

[11] Patent Number: 6,163,258
[45] Date of Patent: *Dec. 19, 2000

[54] TOY THAT PROVIDES AN INDICATION WHEN AN END USER CONSUMES A CONSUMABLE SUBSTANCE

[75] Inventors: Elliot A. Rudell; Raymond Earl Fisher, both of Torrance; George Foster, Long Beach, all of Calif.

[73] Assignee: Elliot Rudell, Torrance, Calif.

[ * ] Notice: This patent is subject to a terminal disclaimer.

[21] Appl. No.: 09/206,809

[22] Filed: Dec. 7, 1998

[51] Int. Cl.$^7$ .................................................. G08B 21/00
[52] U.S. Cl. ...................... 340/540; 340/384.7; 340/692; 446/175
[58] Field of Search ..................................... 340/540, 692, 340/384.7, 384.6; 307/116; 426/106, 110, 87, 134, 124

[56] References Cited

U.S. PATENT DOCUMENTS

| | | |
|---|---|---|
| D. 260,655 | 9/1981 | Guay . |
| 2,126,858 | 8/1938 | Zadek . |
| 2,663,866 | 12/1953 | Simpson . |
| 2,722,153 | 11/1955 | Greco . |
| 2,787,055 | 4/1957 | Wertz . |
| 2,800,825 | 7/1957 | Guin Y toussaint . |
| 2,980,039 | 4/1961 | Jolly . |
| 3,510,643 | 5/1970 | File . |
| 3,592,195 | 7/1971 | Van Wagenen . |
| 3,627,161 | 12/1971 | Wergeland . |
| 3,655,325 | 4/1972 | Toppel . |
| 3,839,793 | 10/1974 | Crapio . |
| 4,072,314 | 2/1978 | Rosen et al. . |
| 4,121,835 | 10/1978 | Garabedian . |
| 4,207,673 | 6/1980 | DiGirolamo et al. . |
| 4,252,273 | 2/1981 | Karterman . |
| 4,282,681 | 8/1981 | McCaslin . |
| 4,341,230 | 7/1982 | Siahou . |
| 4,347,683 | 9/1982 | Maxim . |
| 4,383,386 | 5/1983 | Giordano et al. . |
| 4,531,310 | 7/1985 | Acson et al. . |
| 4,631,715 | 12/1986 | Hoover . |
| 4,646,350 | 2/1987 | Batra . |
| 4,765,623 | 8/1988 | Cardillo et al. . |
| 4,779,344 | 10/1988 | Panisch . |
| 4,809,335 | 2/1989 | Rumsey . |
| 4,828,527 | 5/1989 | Spector . |
| 4,840,371 | 6/1989 | Harris . |
| 4,867,726 | 9/1989 | Fujimaki ................................ 446/175 |
| 4,914,748 | 4/1990 | Schlotter, IV et al. . |
| 4,936,780 | 6/1990 | Cogliano . |
| 4,941,857 | 7/1990 | Fujimaki . |
| 4,973,941 | 11/1990 | Davis et al. ......................... 340/384.7 |
| 5,043,704 | 8/1991 | Blakeney . |
| 5,073,140 | 12/1991 | Lebensfeld et al. . |
| 5,075,970 | 12/1991 | Albert . |
| 5,094,644 | 3/1992 | Kelley . |
| 5,209,692 | 5/1993 | Coleman et al. . |
| 5,228,879 | 7/1993 | Fromm . |
| 5,233,662 | 8/1993 | Christensen . |
| 5,482,078 | 1/1996 | Yeh ....................................... 340/692 |
| 5,536,196 | 7/1996 | Sternberg . |
| 5,722,590 | 3/1998 | Miller . |
| 5,785,406 | 7/1998 | Lee . |
| 5,939,983 | 8/1999 | Rudell et al. ........................... 340/540 |

FOREIGN PATENT DOCUMENTS

WO 94/17691  8/1994  WIPO .

*Primary Examiner*—Jeffrey A. Hofsass
*Assistant Examiner*—John Tweel, Jr.
*Attorney, Agent, or Firm*—Irell & Manella LLP

[57] ABSTRACT

A toy that activates an indicator while an end user consumes an edible substance. The toy includes a first electrode and a second electrode that are connected to the indicator. An electrical path is created between the first and second electrodes while the end user is consuming the consumable substance to close an electrical circuit with the indicator. The closed circuit activates the indicator.

6 Claims, 12 Drawing Sheets

TOY THAT PROVIDES AN INDICATION WHEN AN END USER CONSUMES A CONSUMABLE SUBSTANCE

BACKGROUND OF THE INVENTION

1. Field of the Invention

The present invention relates to a sound emitting and/or illuminated toy "ice pop".

2. Description of Related Art

Toys which provide an element of mystery to a child have been commercially successful. One such type of toy was a doll marketed by DSI, Inc. under the trademark ROSIE. ROSIE would speak when an end user(s) held both of the doll's hands. The hands each had an electrode that were coupled to a sound generating device within the doll. By grasping the doll's hands the end user provided a switch that electrically coupled the electrodes. The coupled electrodes closed a circuit within the doll so that the sound generating device produced a sound.

Tiger Electronics and Captoys, Inc. have both marketed sound producing wands under the trademarks BUBBLE BOPPER and MUSICAL BUBBLE TUNES, respectively. The wands each had electrodes that were coupled to a sound generating device. The end user would create a liquid bubble and then try to place the electrodes in contact with the bubble. When in contact with the wand, the liquid bubble would provide a medium that electrically coupled the electrodes so that the sound device generated a sound.

U.S. Pat. No. 4,914,748 issued to Schlotter, IV et al. discloses a novelty flashlight which illuminates a piece of candy when the end user depresses a button on a handle of the device.

SUMMARY OF THE INVENTION

A toy that activates an indicator while an end user consumes a consumable substance. The toy includes a first electrode and a second electrode that are connected to the indicator. An electrical path is created between the first and second electrodes while the end user is consuming the consumable substance to close an electrical circuit with the indicator. The closed circuit activates the indicator.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 13a is an exploded view of a handle of the toy shown in FIG. 12;

FIG. 13b is an exploded view of an alternate embodiment of the toy shown in FIG. 13a;

DETAILED DESCRIPTION OF THE INVENTION

Figure 1:
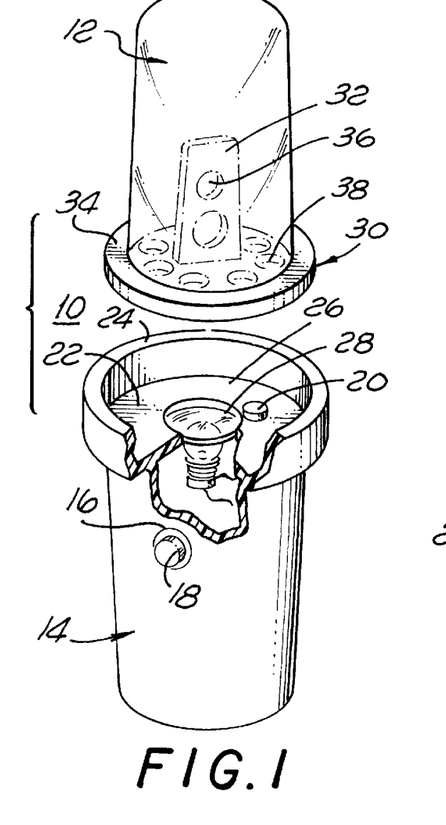
FIG. 1 is a perspective view of a toy device of the present invention.

Referring to the drawings more particularly by reference numbers, FIG. 1 shows a toy device 10 of the present invention. The toy device 10 includes a frozen liquid 12 that is coupled to a handle 14. The device 12 has a first electrode 16 located on an outer surface of the handle 14. The first electrode 16 is preferably concentric with a button 18 that can be depressed by the end user. The device 12 also contains a second electrode 20 that is located within a cavity 22 that is defined by an annular lip 24 of the handle 14. Mounted to a base 26 of the cavity 22 is a light bulb 28. The handle 14 is typically constructed from a low cost molded plastic material. The electrodes 16 and 20 are typically constructed from an electrically conductive material such as copper.

The frozen liquid 12 is preferably a flavored water based substance typically used to form "popcicles" that can be licked and consumed by an end user. The frozen liquid 12 is supported by a substrate 30. The substrate 30 includes a tab 32 that extends from a base plate 34. The tab 32 preferably contains holes 36 that increase the adhesion of the frozen liquid 12 to the substrate during the formation of the frozen element 12. The base plate 34 has a plurality of holes 38 that allow the second electrode 20 to come into contact with the frozen liquid 12 when the substrate 30 is inserted into the cavity 22.

Figure 2:
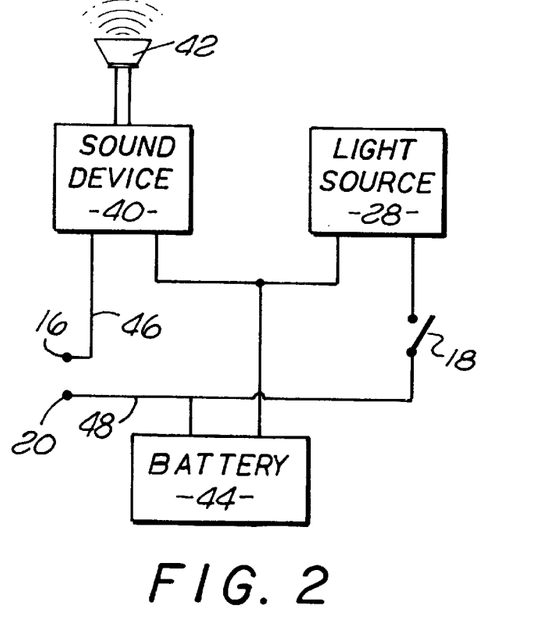
FIG. 2 is a schematic of a circuit of the toy device.

FIG. 2 shows a schematic of the electrical system of the toy device 10. The handle 14 contains a sound generating device 40 and a speaker 42 that can generate and emit sounds from the device 10. The sound generating device 40 can be a sound generating integrated circuit(s) mounted to a printed circuit board as is known in the art. The device 40 can generate a series of different sounds to increase the complexity of the toy 10. For example, the device 40 may generate a "whoop" sound, followed by a "quack" sound. The device 10 also contains a battery 44 that powers the sound generating device 40 and the speaker 42. The battery 44 is typically a 1.5 or 3 volt device that can be installed by removing a cover (not shown) located at the bottom of the handle 14.

The first electrode 16 is connected to the sound device 40 by line 46. The battery 44 is connected to the second electrode 20 by line 48. The sound generating device 40 receives power and generates sound when the first electrode 16 is electrically coupled to the second electrode 20. The light bulb 28 is coupled to the battery 44 by the button 18. The light bulb 28 emits a beam of light into the frozen liquid 12 when the button 18 is depressed and the circuit is closed to connect the battery 44 to the bulb 28.

Figure 3:
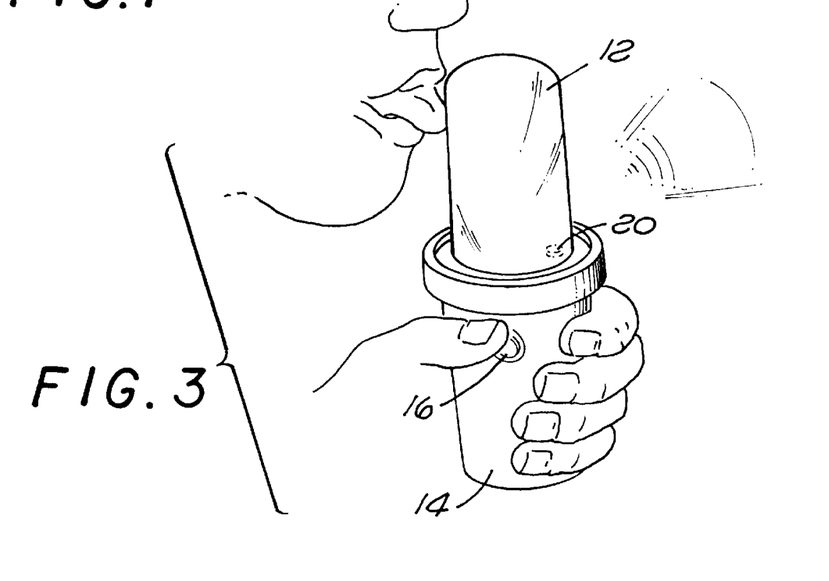
FIG. 3 is a perspective view showing an end user operating the toy device.

As shown in FIG. 3, the toy device 10 is operated by an end user who grabs the handle 14 and licks the frozen liquid 12. The hand of the end user is in contact with the first electrode 16. The tongue of the end user is electrically coupled to the second electrode 20 by the frozen liquid 12. The end user and frozen liquid 12 electrically couple the first electrode 16 to the second electrode 20 so that the sound generating device 40 and speaker 42 emit a sound(s). The toy device 10 will emit a sound each time the end user licks the frozen liquid 12, thereby providing an element of surprise and mystery in using the toy. The end user can also depress the button 18 to illuminate the frozen liquid while licking the device 10.

Figures 4, 5:
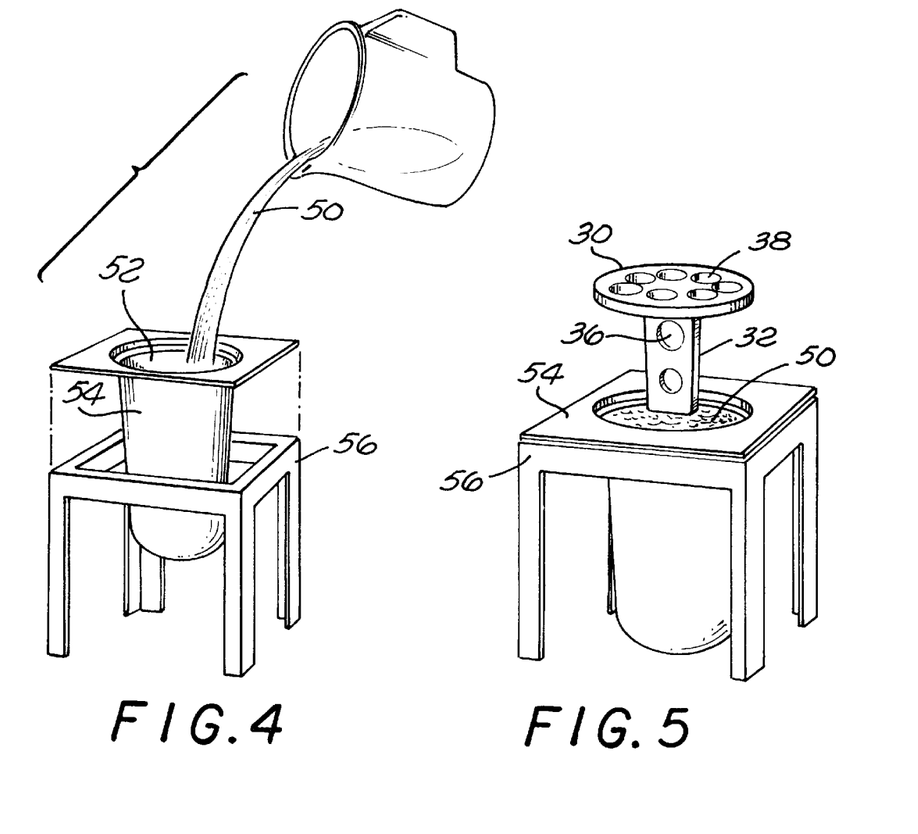
FIG. 4 is a perspective view showing a liquid being poured into a mold.
FIG. 5 is a perspective view showing a substrate being inserted into the mold.

FIGS. 4 and 5 show a preferred method of forming the frozen liquid 12. The liquid substance 50 is poured into an inner cavity 52 of a mold 54. The mold 54 is supported by a stand 56. The mold 54 is preferably constructed from a flexible resilient material which can be readily detached from the frozen liquid after formation, and used for the creation of another frozen element. The substrate 30 is inserted into the inner cavity 52 while the substance 50 is in the liquid state. The mold 54, liquid 50 and substrate 30 are then placed in a refrigeration unit to change the phase of the substance to a solid state. The mold 54 and frozen liquid 12 are lifted from the stand 56 and the mold 54 is then peeled away from the frozen item 12. The substrate 30 can then be snapped into the handle 14 to assembly the toy device 10.

Figure 6:
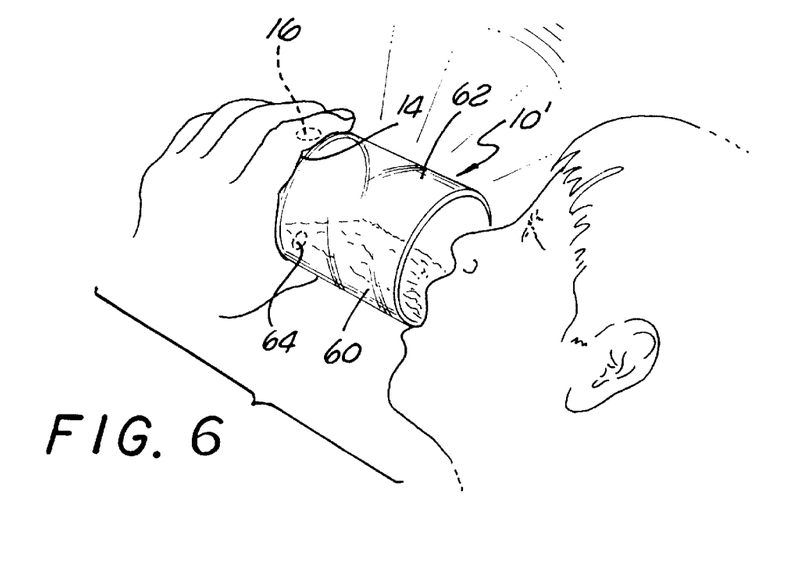
FIG. 6 is a perspective view showing an alternate embodiment of the toy device.

FIG. 6 shows an alternate embodiment of the toy device 10' which utilizes a liquid 60 and the end user to couple the first 16 and second 20 electrodes of the handle 14. The liquid 60 is located within a cup 62 which has a contact 64 that is in contact with the second electrode 20. The cup 62 is preferably constructed from a transparent material so that the liquid can be illuminated by the light bulb 28. When the end user drinks the liquid, the user and liquid create an electrical path between the electrodes 16 and 20, so that the sound generating device 40 and speaker 42 emit a sound.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. By way of example, the circuit can be varied so that the toy illuminates the frozen liquid when the end user licks the frozen item. As a further alternate embodiment, the toy can both illuminate the frozen liquid and emit a sound when the end user licks the frozen item. Additionally the toy device may be constructed without the electrodes, wherein the device illuminates the frozen item by depressing the button 18, and/or emits a sound when the button 18 is depressed.

Figure 7:
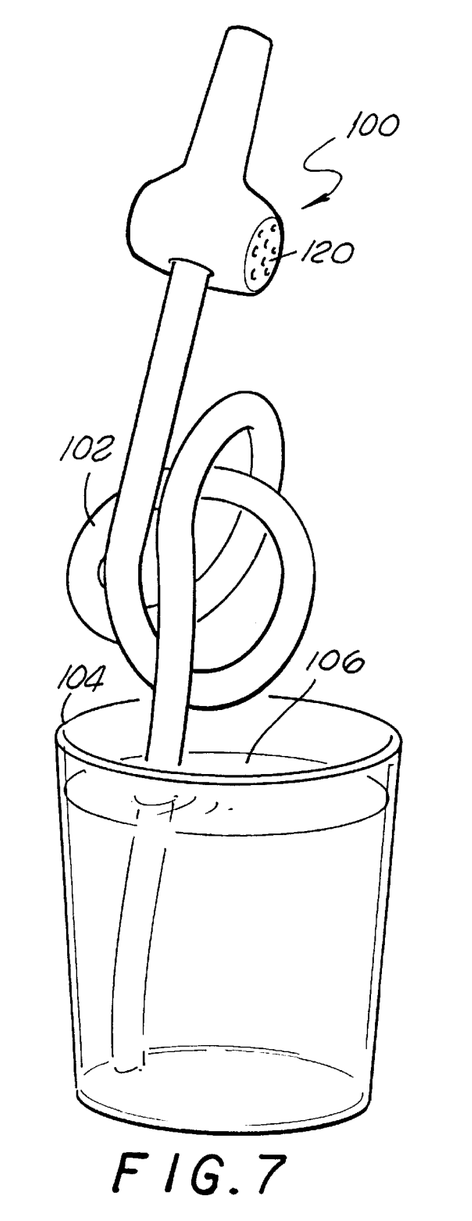
FIG. 7 is a perspective view showing a toy of the present invention.
Figure 7A:
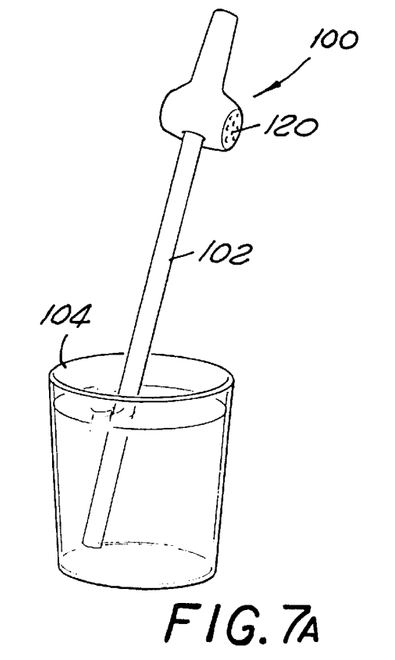
FIG. 7a is a perspective view showing the toy attached to a straight straw.
Figure 8:
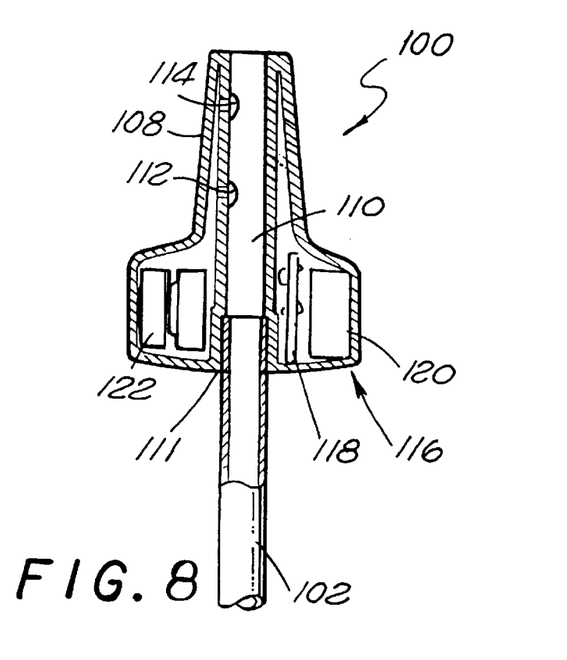
FIG. 8 is a cross-sectional view showing the toy of FIG. 7.

FIGS. 7, 7a and 8 show a toy 100 of the present invention. The toy 100 may be attached to a conventional or twisted straw 102 that is placed into a container 104 which has a liquid 106. The toy straw 100 includes a housing 108 which has an inner channel 110 that is in fluid communication with the liquid 106 within the container 104. The housing 108 may have a port 111 that receives the end of the conventional straw 102.

Located within the inner channel 110 is a first electrode 112 and a second electrode 114. One of the electrodes 112 or 114 is connected to an indicator 116. The indicator 116 may be a sound generating device such as a "sound chip" 118 that is coupled to a speaker 120. The speaker 120 and chip 118 generate a sound when the indicator 116 is activated. Alternatively, the indicator 116 may be a light source that emits a beam of light when activated. As yet another alternative, the indicator 116 may include both a light source and a sound generating device.

The housing 108 may include batteries 122 that are electrically connected to the indicator 116 and one of the electrodes 112 or 114. The housing 108 can be constructed from a plastic material such as high impact styrene or polypropylene that is molded about both the indicator 116 and the batteries 122.

In operation, the end user draws the liquid 106 through the inner channel 110 of the toy 100 and past the electrodes 112 and 114. The liquid within the inner channel 110 creates an electrical path between the electrodes 112 and 114. The electrical path closes the circuit and activates the indicator 116.

Figures 9, 10, 11:
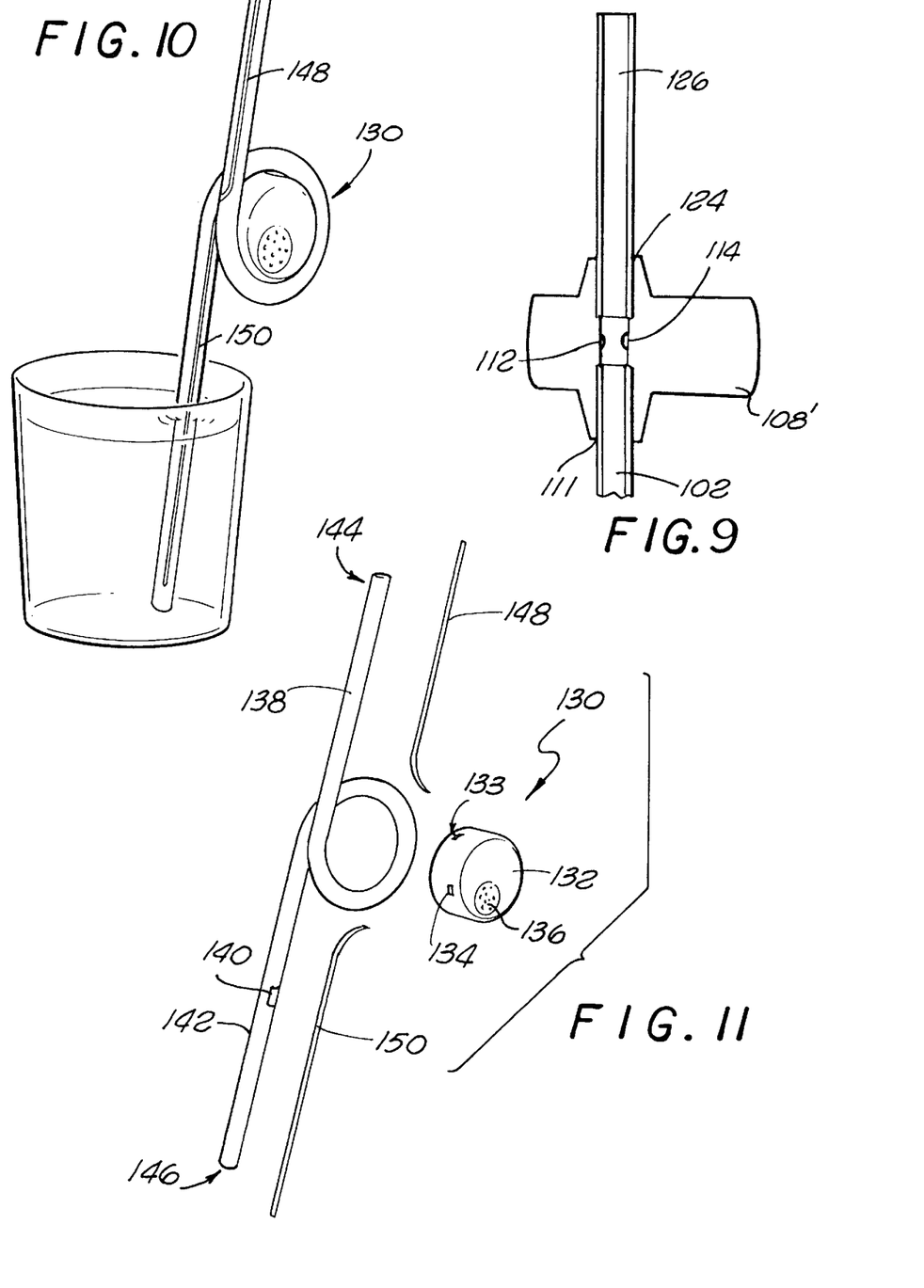
FIG. 9 is a cross-sectional view showing an alternate embodiment of the toy.
FIG. 10 is a perspective view of an alternate embodiment of the toy.
FIG. 11 is an exploded view of the toy of FIG. 10.

FIG. 9 shows an alternate embodiment wherein the housing 108' has a second port 124 that can receive another conventional straw 126. The straw 126 can be pulled out of the housing 108' and replaced with another straw. The housing 108' can therefore be reused without requiring that the end user come into contact with the housing 108'. The housing 108' includes the first 112 and second 114 electrodes and an indicator (not shown).

FIGS. 10 and 11 show another embodiment of a toy 130. The toy 130 includes a housing 132 which has a first electrode 133 and a second electrode 134. The electrodes 133 and 134 are coupled to an indicator 136 which may be a light source or a sound generating device. The housing 132 is attached to a conventional straw 138 which has an inner channel 140 and an outer surface 142. The channel 140 and outer surface 142 extend from a proximal end 144 to a distal end 146 of the straw 138. The first electrode 133 includes a conductive strip 148 that extends along the outer surface to the proximal end 144 of the straw 130. The second electrode 134 includes a conductive strip 150 that extends to the distal end 146.

The indicator 136 is activated when the end user makes contact with the conductive strip 148 and draws liquid through the inner channel of the straw 138 to create an electrical path between the first 133 and second 134 electrodes. The strips 148 and 150, liquid, and end user create an electrical path between the electrodes 133 and 134.

Figure 12:
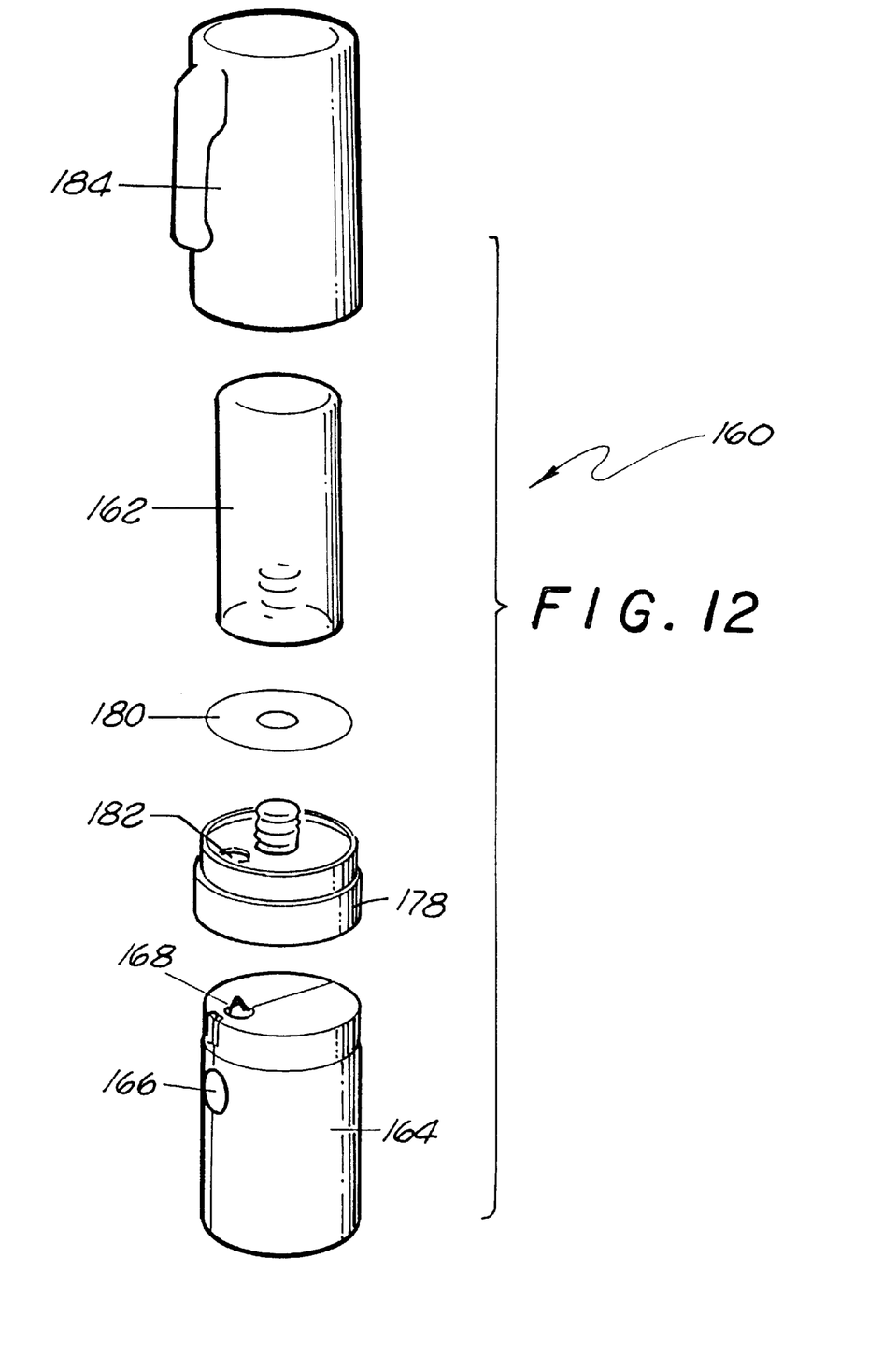
FIG. 12 is an exploded view of a toy that supports a piece of candy.
Figures 13A, 13B:
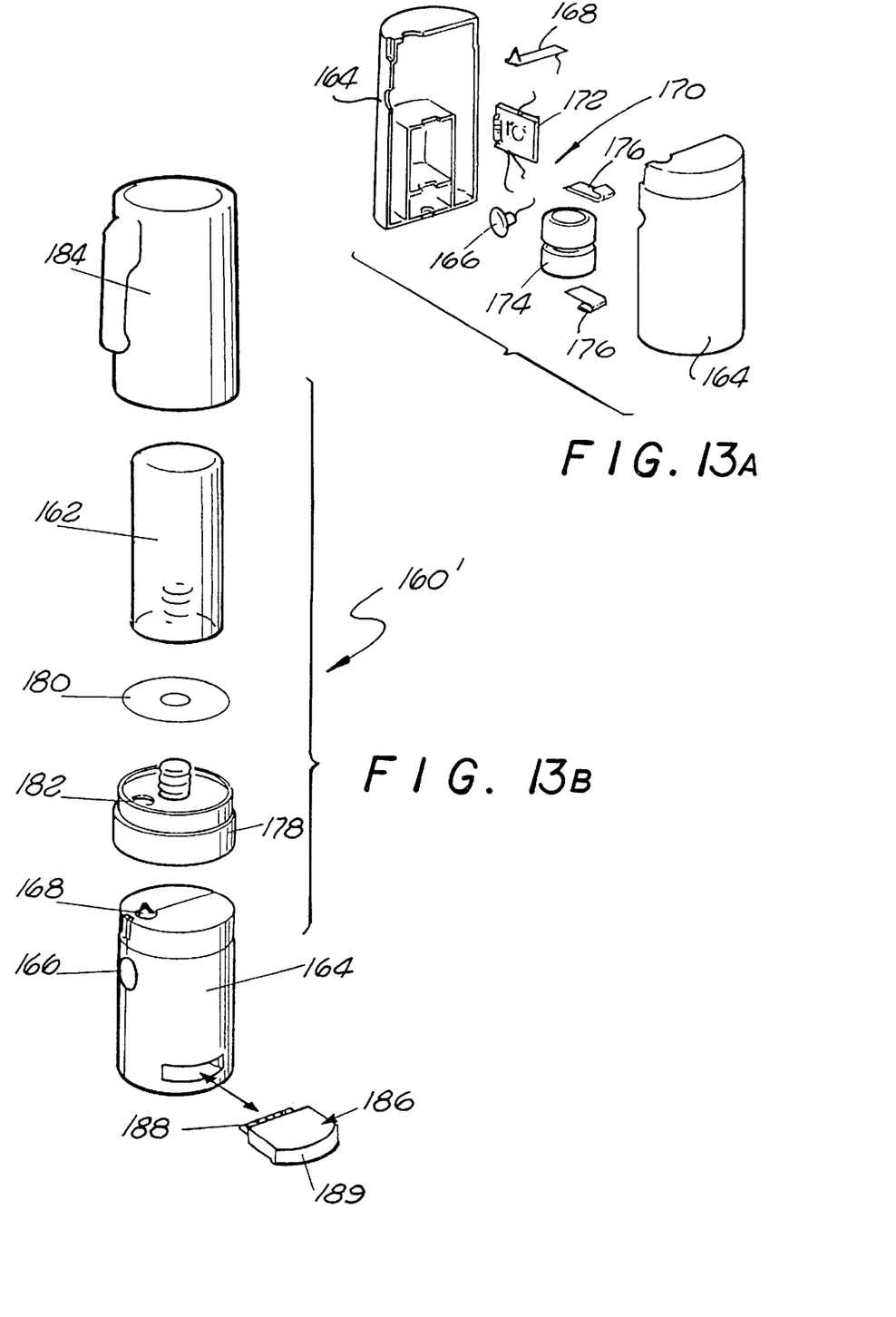

FIGS. 12 and 13a show a toy 160 which supports an edible substance such as a piece of hard candy 162. The toy 160 includes a handle 164 which has a first electrode 166 and a second electrode 168. The electrodes 166 and 168 are coupled to an indicator 170. The indicator 170 may include a sound generating device 172, batteries 174 and battery contacts 176. Alternatively, the indicator 170 may be a light source (not shown), or a light source and the sound generating device 172.

The candy 162 is attached to an anchor 178 that is mounted to the handle 164. A metal foil 180 can be placed between the candy 162 and the base of the anchor 178. The anchor 178 has an aperture 182 that allows contact between the second electrode 168 and the foil 180 to create an electrical path between the candy 162 and the electrode 168. The toy 160 may include a removable cap 184 that protects the candy 162.

In operation, the end user grabs the first contact 166 and licks the candy 162. Although the present invention is not limited to such a theory of operation, it is believed that saliva deposited onto the candy by the end user creates an electrical path between the foil 180 and the user. When the end user makes contact with the candy, the user, saliva and foil 180 create an electrical path between the electrodes 166 and 168 and activate the indicator 170.

FIG. 13b shows an alternate embodiment of the toy 160' which has a replaceable indicator cartridge 186. The indicator 186 may include a sound generating integrated circuit (not shown) that is mounted to a printed circuit board 188 and enclosed by an encapsulant 189. The circuit board 188 may have a plurality of conductive contacts that plug into a corresponding card edge connector located within the handle 164' to couple the sound generating circuit to the electrodes 166 and 168.

Figure 14:
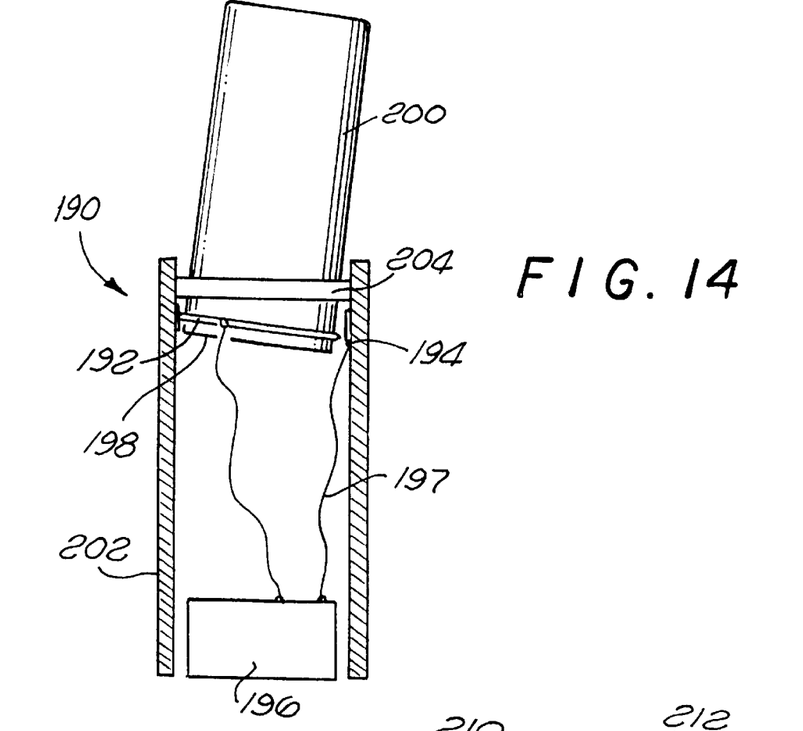
FIG. 14 is a cross-sectional view of an alternate embodiment of the toy shown in FIG. 12.

FIG. 14 shows an alternate embodiment of a toy 190. The toy 190 includes a first electrode 192 and a second electrode 194 that are connected to an indicator 196 by wires 197. The indicator 196 may be a sound generating device and/or a light source. The first electrode 192 is connected to an anchor 198 that supports an edible substance such as a piece of candy 200. The second electrode 194 is attached to a handle 202.

The anchor 198 and toy handle 202 are constructed so that the candy 200 can pivot within the handle 202. Movement of the candy 200 creates an electrical contact between the electrodes 192 and 194, and activates the indicator 196. By way of example, the candy 200 may pivot about a gimbal 204 incorporated into the handle 202. When the end user licks the candy, the force of the tongue creates a moment that pivots the anchor 198 to create an electrical contact between the electrodes and activates the indicator 196.

Figure 15:
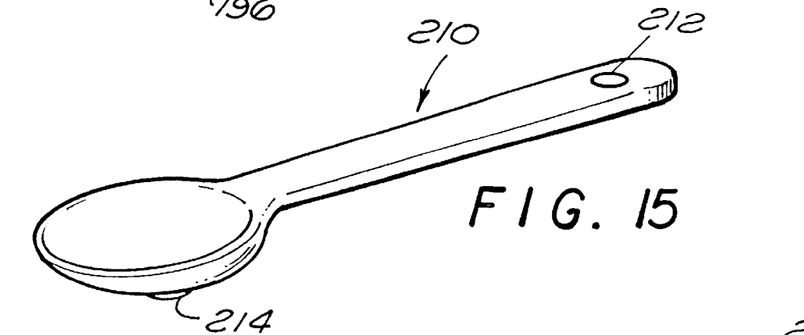
FIG. 15 is a perspective view of a utensil which has a pair of electrodes.
Figure 16:
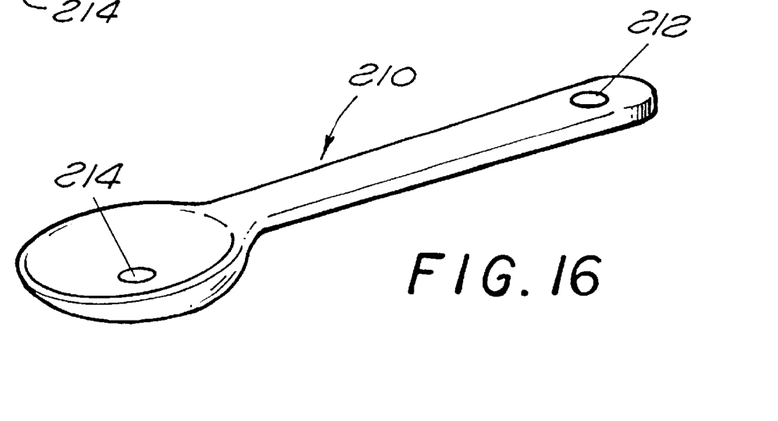
FIG. 16 is an alternate embodiment of the utensil shown in FIG. 15.

FIGS. 15 and 16 show a toy utensil 210 which has a pair of electrodes 212 and 214 that are connected to an indicator (not shown). The indicator is activated when the end user grabs the electrode 212 and places the electrode 214 within their mouth. The embodiment shown in FIG. 15 allows contiguous contact between the user and the electrode 214. In the embodiment shown in FIG. 16 food placed within the spoon is also part of the electrical path so that when the end user consumes the food the indicator is activated.

Figure 17:
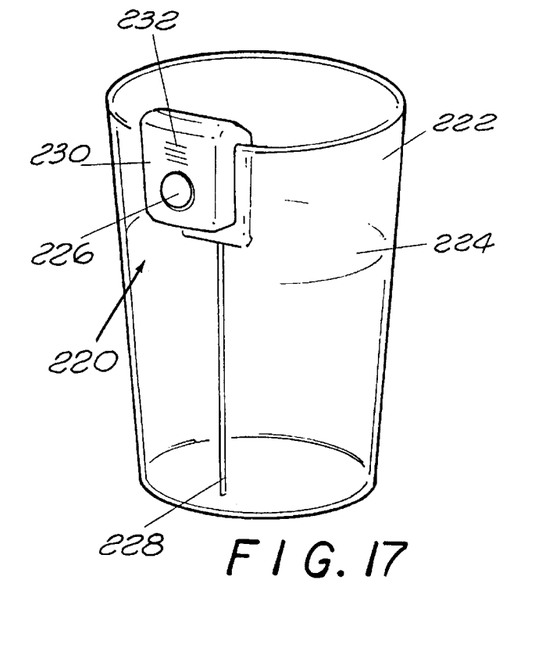
FIG. 17 is a perspective view of an alternate embodiment of the toy device attached to a container.

FIG. 17 is a toy device 220 which can be attached to an existing container 222. The container 222 contains a consumable substance 224 such as a liquid. The device 220 includes a first electrode 226 and a second electrode 228 that are attached to a housing 230. The second electrode 228 extends into the consumable substance 224. The housing 230 is typically constructed from a plastic material that is molded into a shape which can be placed onto the lip of the container 222. The housing 230 contains an indicator 232 which emits a sound and/or light when the electrodes 226 and 228 are electrical connected.

Figure 18:
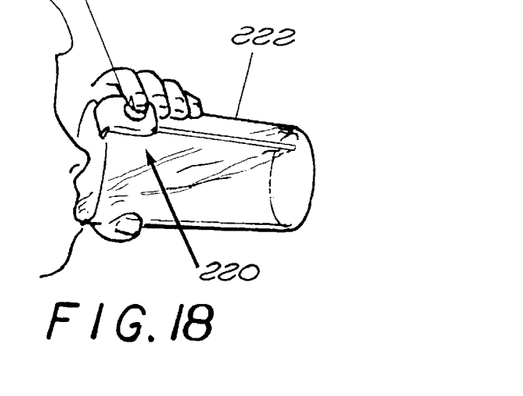
FIG. 18 is a perspective view showing the toy device being used by an end user.

As shown in FIG. 18 the device 220 is operated by an end user coming into contact with the first electrode 226 and consuming the consumable substance from the container 222. The end user closes an electrical path between the electrodes 226 and 228 and activates the indicator 232. Although a glass container is shown and described, it is to be understood that the container may be a bowl or other device that is used to hold a consumable substance. Additionally, although drinking a liquid from the container is shown and described, it is to be understood that the present invention can be utilized with other consumable substances such as ice cream, etc.

Figure 19:
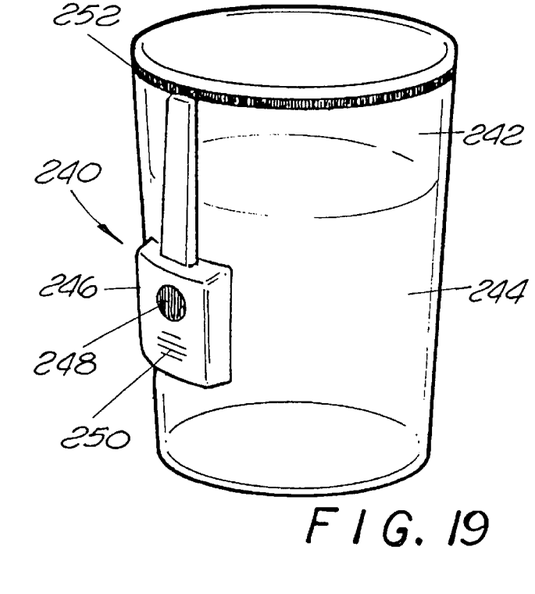
FIG. 19 is a perspective view showing an alternate embodiment of the toy device.

FIG. 19 is another toy device 240 that can be attached to an existing container 242 which holds a consumable substance 244 such as a liquid. The device 240 includes a housing 246 which has a first electrode 248 and an indicator 250. The indicator 250 can emit either sound and/or light. The device 240 also includes a second electrode 252 attached to the lip of the container 242. The second electrode 252 can be a metal clip that is pushed onto the lip from the bottom of the container 242.

In operation, an end user comes into contact with the first electrode 248 and places the second electrode 252 within their mouth while consuming the substance 244. The end user creates an electrical path between the electrodes 248 and 252 which activates the indicator 250. The toy device shown in FIG. 19 operates without requiring contact between the consumable substance 244 and the second electrode 252.

Figure 20:
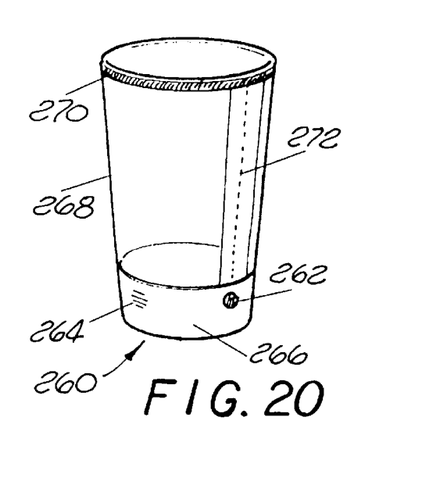
FIG. 20 is a perspective view showing an alternate embodiment of the toy device.

FIG. 20 is an alternate embodiment of a toy device 260 which has a first electrode 262 and an indicator 264 located in the base 266 of a container 268. The first electrode 262 is connected to a second electrode 270 by an insulated wire 272. The toy 260 operates in the same manner as the toy shown in FIG. 19. The device 260 can be adapted to be attached to an existing container, or incorporated into a new container.

Figures 21, 22, 23, 24:
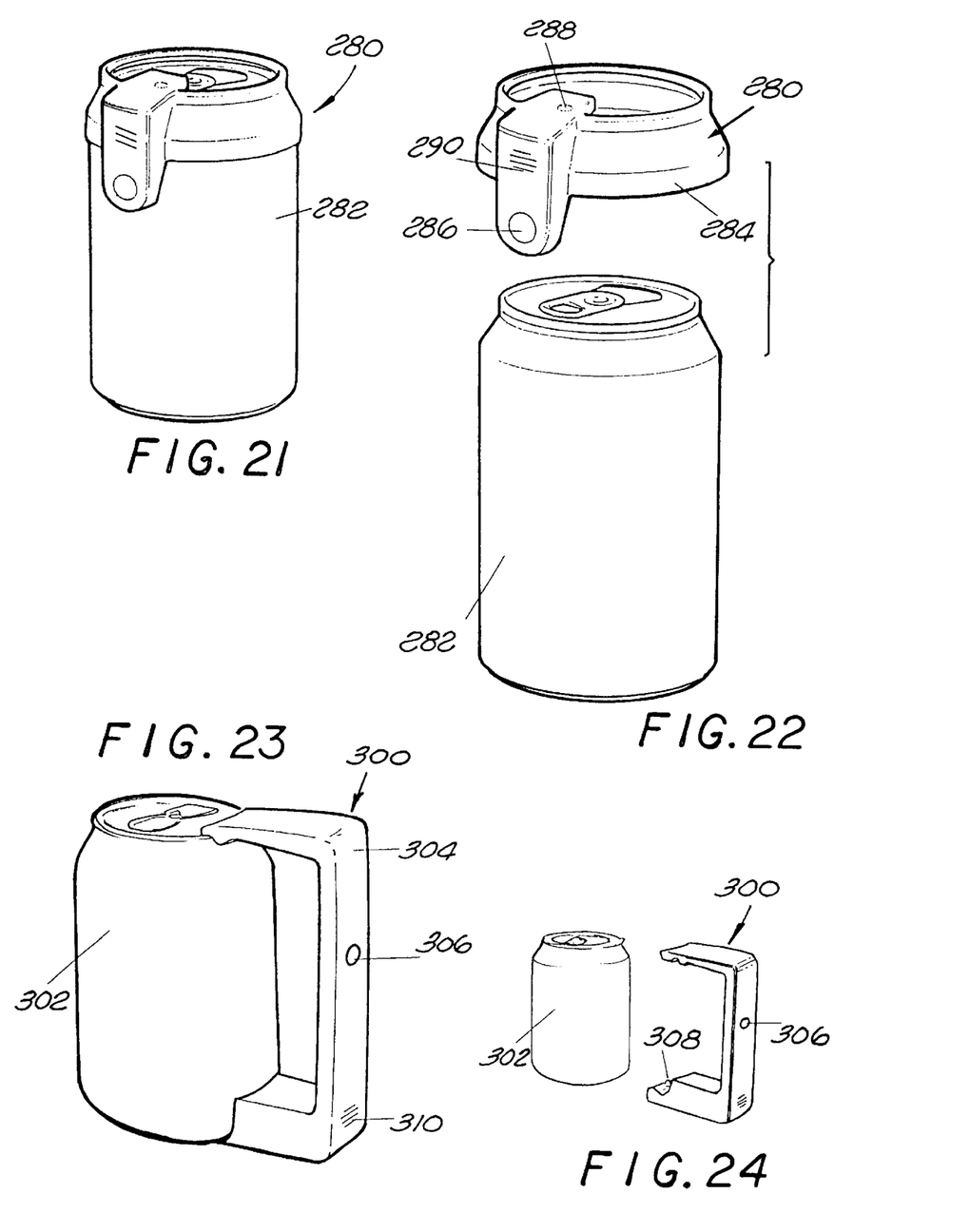
FIG. 21 is a perspective view showing a toy device that is attached to a can.
FIG. 22 is an exploded view of the toy device and can of FIG. 21.
FIG. 23 is a perspective view of an alternate embodiment of a toy device that is attached to a can.
FIG. 24 is an exploded view of the toy device and can of FIG. 23.

FIGS. 21 and 22 show a toy device 280 that is attached to a metal can 282. The device 280 includes a housing 284 which contains a first electrode 286, a second electrode 288 and an indicator 290. The indicator 290 emits sound and/or light. The housing 284 is constructed to be attached to the top of the can 282. The second electrode 288 is in contact with the top portion of the can 282. It being found that the sides of conventional aluminum cans have a layer of dielectric material.

In operation, an end user makes contact with the first electrode 286 and consumes the substance within the can 282. The can 282, substance and end user create an electrical path between the electrodes 286 and 288 that activates the indicator 290.

FIGS. 23 and 24 show another toy device 300 that can be attached to a metal can 302. The device 300 includes a C shaped housing 304 that can be clipped onto the upper and lower lips of the can 302. The housing 304 includes a first electrode 306, a second electrode 308 and an indicator 310. The second electrode 308 is in contact with the bottom of the can 302. Alternatively, the second electrode 308 can be in contact with the top of the can 302. The device operates in the same manner as the device shown in FIGS. 21 and 22.

Figures 25, 26, 27:
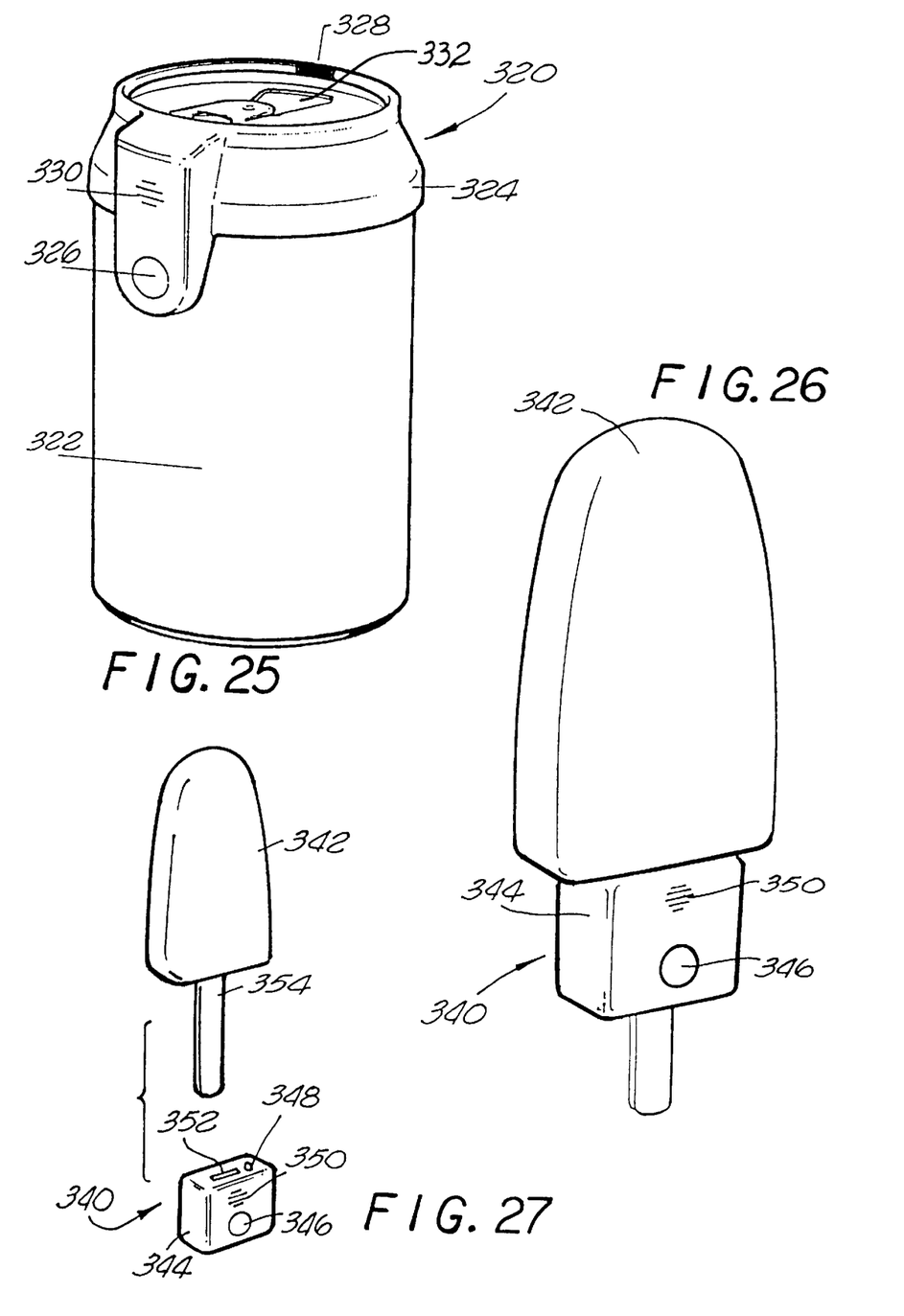
FIG. 25 is a perspective view of an alternate embodiment of a toy device attached to a can.
FIG. 26 is perspective view of a toy device that is coupled to a popsicle.
FIG. 27 is an exploded view of the toy device and popsicle of FIG. 26.

FIG. 25 shows another toy device 320 that can be attached to a metal can 322. The toy device 320 includes a housing 324 which has a first electrode 326, a second electrode 328 and an indicator 330. The second electrode 328 is located adjacent to the opening 332 of the can 322. In operation, an end user makes contact with the first electrode 326 and places the second electrode 328 within their mouth while consuming the substance within the can 322. The end user creates an electrical path between the electrodes 326 and 328 which activates the indicator 330. Like the devices shown in FIGS. 19 and 20, the toy device 320 does not require contact between the second electrode 328 and the substance to activate the indicator 330.

FIGS. 26 and 27 show a toy device 340 that is attached to a POPSICLE 342. A POPSICLE 342 being defined as a frozen food item on a stick. The device 340 includes a housing 344 which has a first electrode 346, a second electrode 348 and an indicator 350. The housing 344 also includes an inner channel 352 that receives the stick 354 of the popsicle. In operation, the end user makes contact with the first electrode 346 and licks the popsicle 342. The end user and licked popsicle create an electrical path between the electrodes 346 and 348 that activates the indicator 350.

Figures 28, 29:
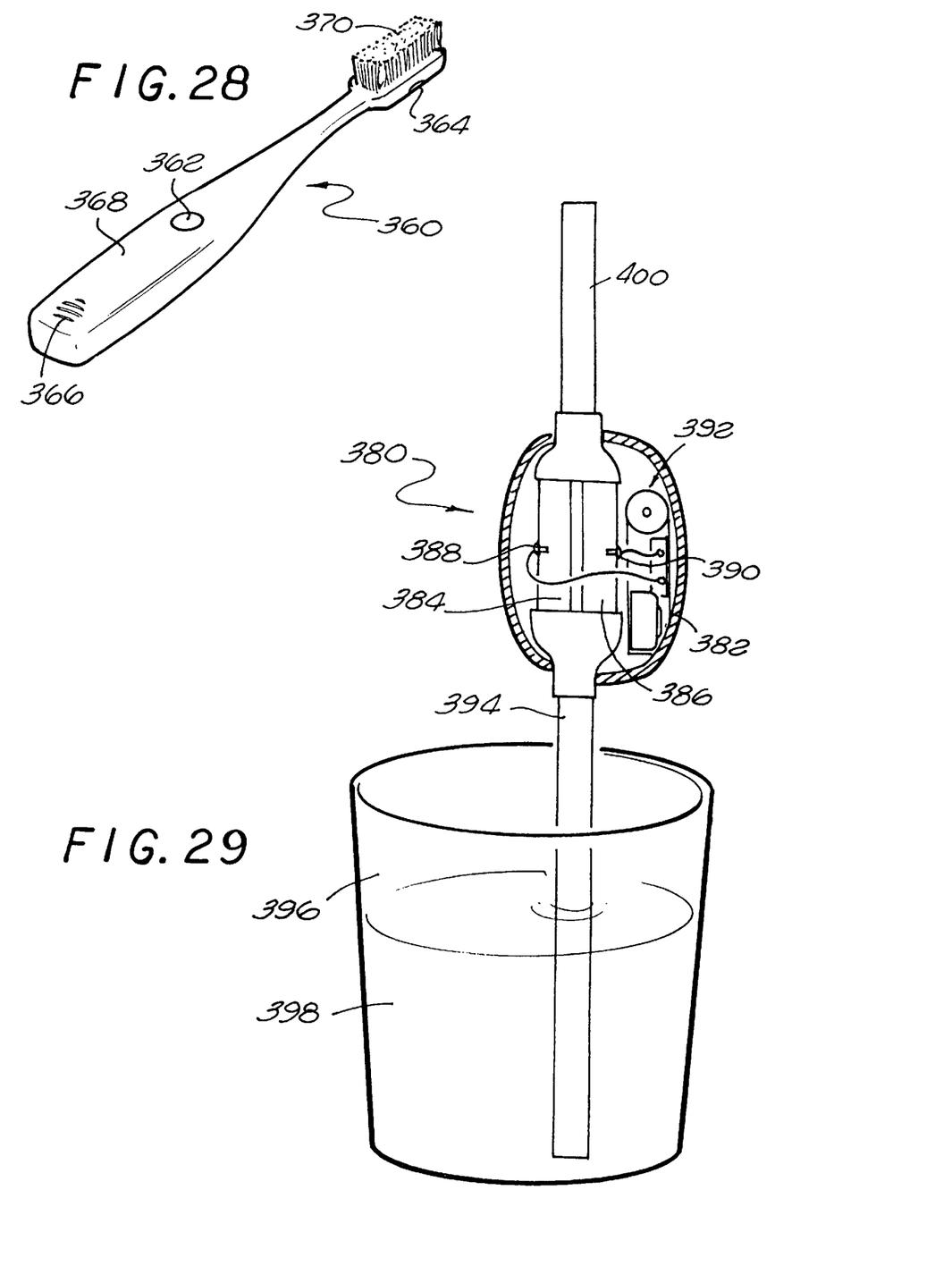
FIG. 28 is a perspective view of a toothbrush which has a pair of electrodes.
FIG. 29 is a sectional view of a toy device which has a pair of internal channels.

FIG. 28 shows a toothbrush 360 which has a first electrode 362, a second electrode 364 and an indicator 366. The first electrode 362 is located in the handle 368 of the toothbrush 360. The second electrode 364 is located adjacent to the bristles 370 of the toothbrush 360. In operation, the end user makes contact with the first electrode 362 and places the bristles 370 and second electrode 364 in their mouth. The end user creates an electrical path between the electrodes 362 and 364 that activates the indicator 366. As an alternate embodiment the second electrode 364 can be located within the bristles 370 of the toothbrush 360. As an alternate embodiment, the electrodes 362 and 364 and indicator 366 may be mounted to a housing that is attached to an existing toothbrush.

FIG. 29 shows a toy device 380 which includes a housing 382 that has a pair of channels 384 and 386. A first electrode 388 is located within the first channel 384. A second electrode 390 is located within the second channel 386. The electrodes 388 and 390 are connected to an indicator 392 that can generate sound and/or light.

The housing 382 can be connected to a first straw 394 that is inserted into a container 396 which contains a consumable substance 398 such as a liquid, and a second straw 400 that can be inserted into the mouth of an end user. In operation the end user draws the consumable substance through the straws 394 and 400, and both channels 384 and 386 of the housing 382. The liquid creates an electrical path between the electrodes 388 and 390 to activate the indicator 392.

Figures 30, 31:
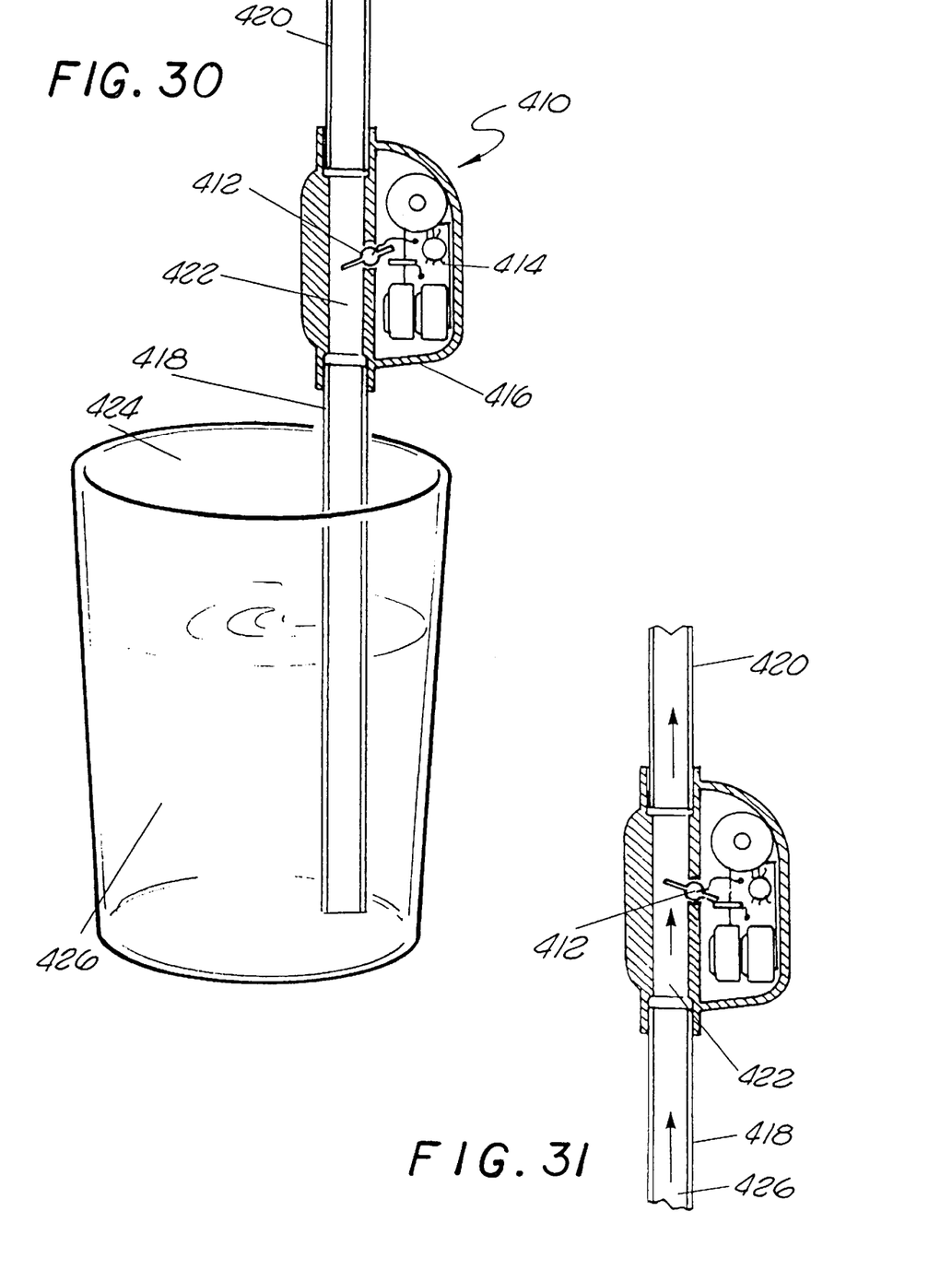
FIG. 30 is a cross-sectional view of a switch activated toy device.
FIG. 31 is a cross-sectional view similar to FIG. 30 showing the switch in a closed position.

FIGS. 30 and 31 show a toy device 410 which utilizes a switch 412 to activate an indicator 414 that generates sound and/or light. The switch 412 and indicator 414 are attached to a housing 416 that can be coupled to a pair of straws 418 and 420. The switch 412 is located within an inner channel 422 of the housing 416. The inner channel is in fluid communication with the straws 418 and 420. Straw 418 is placed within a container 424 which contains a consumable substance such as a liquid 426.

In operation, an end user draws liquid through the straws 418 and 420, and the inner channel 422. The momentum of the liquid moves the switch 412 into a closed position and activates the indicator 414.

It is to be understood that the term consumable substance refers to any substance that is consumed by a human being, including but not limited to a liquid, a frozen liquid or a solid material. Consumed is to include but not be limited to the acts of eating, drinking and licking.

What is claimed is:

1. A device that is used in conjunction with the consumption of a food by an end user, comprising:

a first electrode;

a second electrode; and, an indicator that is coupled to said first and second electrodes and is activated by the end user coming into contact with the food wherein the end user becomes part of a closed circuit between said first and second electrodes.

2. A device that is attached to a metal can that contains a food that is consumed by an end user, comprising:

a housing that is adapted to be attached to the can;

a first electrode that is coupled to said housing;

a second electrode that is coupled to said housing;

an indicator that is coupled to said first and second electrodes and is activated by the end user coming into contact with the food wherein the end user becomes part of a closed circuit between said first and second electrodes.

3. The device as recited in claim 2, wherein said housing is adapted to snap onto a lid of the can and said second electrode is in contact with the can.

4. The device as recited in claim 2, wherein said housing has a C shape that snaps onto the can.

5. The device as recited in claim 2, wherein said second electrode is located adjacent to an opening in the can.

6. A device that is used with a popsicle that is consumed by an end user, comprising:

a housing that is adapted to be coupled to the popsicle;

a first electrode that is attached to said housing;

a second electrode that is attached to said housing and in contact with the popsicle; and, an indicator that is coupled to said first and second electrodes and is activated by the end user consuming the popsicle.

* * * * *

UNITED STATES PATENT AND TRADEMARK OFFICE
CERTIFICATE OF CORRECTION

PATENT NO. : 6,163,258
DATED : December 19, 2000
INVENTOR(S) : Elliot A. Rudell et al.

It is certified that error appears in the above-identified patent and that said Letters Patent is hereby corrected as shown below:

Title page,
Item [63], insert -- [63] Related Application Data: Continuation of application Serial No. 08/879,238, Jun. 19, 1997, Pat. No. 5,939,983. --.

Signed and Sealed this

Sixth Day of August, 2002

Attest:

Attesting Officer

JAMES E. ROGAN
Director of the United States Patent and Trademark Office